United States Patent
Kasten et al.

(10) Patent No.: US 10,884,158 B2
(45) Date of Patent: Jan. 5, 2021

(54) MULTI-BARRIER WELLBORE INTEGRITY INSPECTION SYSTEM WITH ECCENTRICITY CORRECTION

(71) Applicant: GE Energy Oilfield Technology, Inc., Broussard, LA (US)

(72) Inventors: Ansas Matthias Kasten, Niskayuna, NY (US); Yuri Plotnikov, Chesterfield, VA (US); Adrian Ivan, Niskayuna, NY (US); William Robert Ross, Rotterdam, NY (US)

(73) Assignee: GE Energy Oilfield Technology, Inc., Broussard, LA (US)

( * ) Notice: Subject to any disclaimer, the term of this patent is extended or adjusted under 35 U.S.C. 154(b) by 281 days.

(21) Appl. No.: 16/102,323

(22) Filed: Aug. 13, 2018

(65) Prior Publication Data

US 2019/0049618 A1    Feb. 14, 2019

Related U.S. Application Data

(60) Provisional application No. 62/544,131, filed on Aug. 11, 2017, provisional application No. 62/544,188, (Continued)

(51) Int. Cl.
| | |
|---|---|
| *G01V 1/40* | (2006.01) |
| *G01V 5/10* | (2006.01) |
| *E21B 47/13* | (2012.01) |
| *E21B 47/085* | (2012.01) |
| *E21B 47/117* | (2012.01) |

(Continued)

(52) U.S. Cl.
CPC ............ *G01V 5/107* (2013.01); *E21B 47/085* (2020.05); *E21B 47/117* (2020.05); *E21B 47/13* (2020.05); *E21B 47/135* (2020.05);

*E21B 47/16* (2013.01); *G01V 1/44* (2013.01); *G01V 3/30* (2013.01); *G01V 5/10* (2013.01); *G01V 5/145* (2013.01);

(Continued)

(58) Field of Classification Search
None
See application file for complete search history.

(56) References Cited

U.S. PATENT DOCUMENTS

| | | | |
|---|---|---|---|
| 9,696,455 B2 * | 7/2017 | Radtke | ................... G01V 5/104 |
| 2013/0299687 A1 | 11/2013 | Scott | |

(Continued)

OTHER PUBLICATIONS

International Search Report and Written Opinion dated Nov. 15, 2018 in corresponding PCT Appln. No. PCT/US18/46523.

*Primary Examiner* — Aditya S Bhat
(74) *Attorney, Agent, or Firm* — Hogan Lovells US LLP

(57) ABSTRACT

A downhole inspection system includes a neutron imaging device operable to generate data for detecting potential wellbore anomalies and an electromagnetic imaging device operable to generate data for detecting potential wellbore eccentricity. The neutron imaging device includes a neutron generator operable to emit neutrons, and a neutron detector fixed relative to the neutron generation unit and operable to detect backscattered neutrons from a surrounding environment. The electromagnetic imaging device includes at least one transmitter for generating electromagnetic pulse, and at least one receiver for detecting returning electromagnetic pulse. Correlation of the neutron imaging data with the electromagnetic imaging data provides additional data regarding the potential wellbore anomalies.

20 Claims, 7 Drawing Sheets

Related U.S. Application Data filed on Aug. 11, 2017, provisional application No. 62/544,180, filed on Aug. 11, 2017.

(51) Int. Cl.
| | | |
|---|---|---|
| *E21B 47/135* | (2012.01) | |
| *G06F 17/15* | (2006.01) | |
| *E21B 47/16* | (2006.01) | |
| *G01V 1/44* | (2006.01) | |
| *G01V 3/30* | (2006.01) | |
| *G01V 5/14* | (2006.01) | |
| *G01V 8/16* | (2006.01) | |
| *G01V 11/00* | (2006.01) | |

(52) U.S. Cl.
CPC ............... *G01V 8/16* (2013.01); *G01V 11/00* (2013.01); *G06F 17/15* (2013.01)

(56) References Cited

U.S. PATENT DOCUMENTS

| | | | |
|---|---|---|---|
| 2016/0061991 A1* | 3/2016 | Berkcan | G01V 5/145 250/269.2 |
| 2016/0187528 A1 | 6/2016 | Sofiienko et al. | |
| 2016/0282505 A1* | 9/2016 | Lee | G01V 5/125 |
| 2016/0370477 A1 | 12/2016 | Stowe et al. | |

\* cited by examiner

MULTI-BARRIER WELLBORE INTEGRITY INSPECTION SYSTEM WITH ECCENTRICITY CORRECTION

CROSS REFERENCE TO RELATED APPLICATION

This application claims priority to and the benefit of U.S. Provisional Application Ser. No. 62/544,131, filed Aug. 11, 2017, titled "WELLBORE DETECTOR WITH AZIMUTHAL AND SPECTRAL ENERGY RESOLUTION"; U.S. Provisional Application Ser. No. 62/544,180, filed Aug. 11, 2017, titled "MULTI-BARRIER WELLBORE INTEGRITY INSPECTION SYSTEM WITH ECCENTRICITY CORRECTION"; and U.S. Provisional Application Ser. No. 62/544,188, filed Aug. 11, 2017, titled "DATA FUSION ENHANCED MULTI-MODALITY WELLBORE INTEGRITY INSPECTION SYSTEM", the full disclosures of which are each hereby incorporated herein by reference in their entirety for all purposes.

The full disclosures of U.S. patent application No. 16/102,221, concurrently filed on Aug. 13, 2018, titled "WELLBORE DETECTOR WITH AZIMUTHAL AND SPECTRAL ENERGY RESOLUTION"; and U.S. patent application No. 16/102,371, concurrently filed on Aug. 13, 2018, titled "DATA FUSION ENHANCED MULTI-MODALITY WELLBORE INTEGRITY INSPECTION SYSTEM", are each hereby incorporated herein by reference in their entirety for all purposes.

GOVERNMENT LICENSE RIGHTS

This invention was made with U.S. Government support under Contract No. DE-FE0024293 awarded by the Department of Energy. The U.S. Government has certain rights in this invention.

FIELD OF INVENTION

This invention relates in general to wellbore detection, and more particularly to systems and methods for detecting and correcting for wellbore casing eccentricity.

BACKGROUND

Hydrocarbon producing wellbores typically require verification of the integrity of the wellbore structure for commissioning, during extended operation, and for decommissioning purposes. Particularly for decommissioning of offshore wells, it is of high interest to verify the integrity of the wellbore-to-formation boundary to ensure that the offshore well can be effectively plugged and abandoned. Thus, the integrity of wellbore-to-formation boundary needs to be verified before a plug and abandon operation can begin. For example, this may include verifying that there are no significant channel defects in the cement structure of the wellbore. Typically, as first inspection step, the production casing is removed before the integrity of a wellbore can be measured using conventional inspection tools. The casing removal process, which may include the removal of 10,000 feet of casing, is time consuming and costly. Inspection probes that can interrogate the integrity of a wellbore through the production tubing (through-tubing inspection) present a tremendous advantage in this case. Furthermore, integrity inspection of wellbores with multiple casings and/or annuli is very challenging and requires inspection approaches that can penetrate deep into the wellbore structure.

SUMMARY

Applicant recognized the problems noted above herein and conceived and developed embodiments of systems and methods, according to the present disclosure, for wellbore inspection systems.

In an embodiment of the present disclosure, a downhole inspection system includes a tool string lowerable into a wellbore, a neutron imaging device forming at least a portion of the tool string, the neutron imaging device operable to generate data for detecting potential wellbore anomalies, and an electromagnetic pulse imaging device forming another portion of the tool string, the electromagnetic pulse imaging device operable to generate data for detecting wellbore eccentricities. The neutron imaging device includes a neutron generator operable to emit neutrons and a neutron detector fixed relative to the neutron generation unit and operable to detect backscattered neutrons from a surrounding environment. The electromagnetic pulse imaging device includes at least one transmitter coil for generating an electromagnetic pulse, and at least one receiver coil for detecting returning electromagnetic waves. The system further includes a processor configured to receive data from the neutron imaging device and data from the electromagnetic imaging device, and correlate the neutron imaging data and the electromagnetic imaging data to determine if a detected potential wellbore anomaly is attributable to tool eccentricity in the wellbore.

In another embodiment, a downhole inspection system includes a neutron imaging device operable to generate data for detecting potential wellbore anomalies and an electromagnetic imaging device operable to generate data for detecting potential wellbore eccentricity. The neutron imaging device includes a neutron generator operable to emit neutrons, and a neutron detector fixed relative to the neutron generation unit and operable to detect backscattered neutrons from a surrounding environment. The electromagnetic imaging device includes at least one transmitter for generating electromagnetic pulse, and at least one receiver for detecting returning electromagnetic pulse. Correlation of the neutron imaging data with the electromagnetic imaging data provides additional data regarding the potential wellbore anomalies.

In another embodiment, a method of inspecting a wellbore includes positioning a neutron imaging device in a wellbore having a casing comprising one or more layers, emitting neutrons into a portion of a wellbore environment, detecting backscattered neutrons from the portion of the wellbore environment, and generating neutron data for the portion of the wellbore, based at least in part on the detected backscattered neutrons. The method further includes positioning an electromagnetic pulse imaging device in the portion of the wellbore, generating electromagnetic pulses towards the portion of the wellbore, detecting returning electromagnetic pulses generated from eddy currents induced in the casing at the portion of the wellbore, and generating electromagnetic data for the portion of the wellbore based at least in part on the detected returning electromagnetic pulses. The method further includes determining if casing eccentricity is present in the portion of the wellbore based on the electromagnetic data, and correlating the neutron data and the electromagnetic data to determine if a wellbore anomaly is present, in which the potential wellbore anomaly is structural and not due to casing eccentricity.

DETAILED DESCRIPTION OF THE INVENTION

Figure 1:
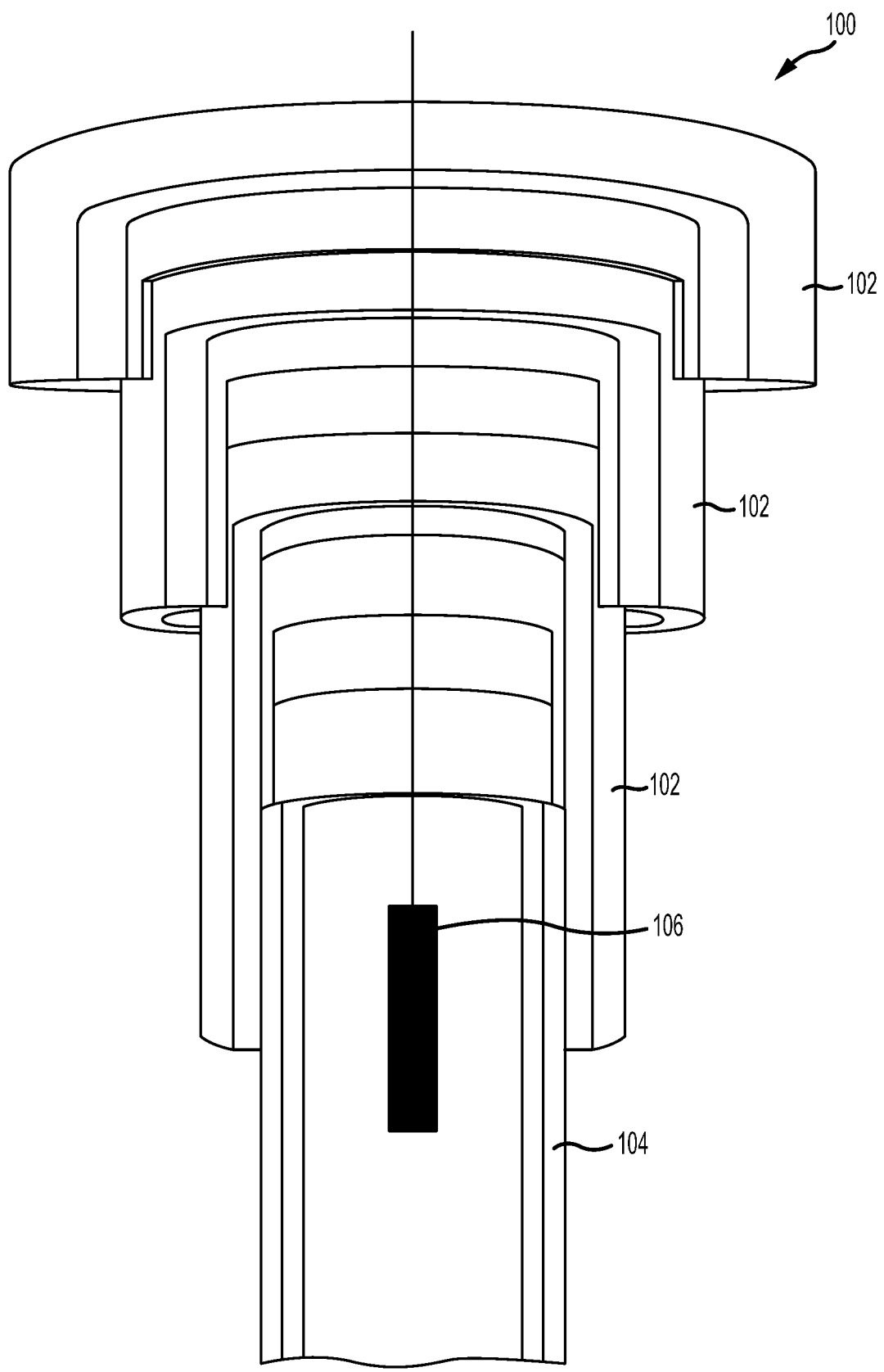
FIG. 1 is an axial partial cross-sectional view of a well integrity inspection system illustrating a well structure and an inspection probe with eccentricity correction, in accordance with various embodiments.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

The presently disclosed wellbore detector assembly allows for detection of wellbore defects, such as oil based mud channel defects among others, deep into the wellbore structure and for through-casing inspection, in which the wellbore can be inspected for defects without requiring removal of casings. Thus, the present techniques may provide time and cost improvements for inspecting wellbores and for plug and abandonment operations. Described herein is a well integrity inspection system configured to inspect a well structure having multiple casing and annuli barriers. The well integrity inspection system includes one or more inspection probes positioned in the well structure. An inspection probe may include a plurality of interrogation modalities each having an excitation assembly for transmitting a plurality of emissions into the well structure. Example interrogation modalities may include a neutron excitation modality, an X-ray modality, a gamma modality, an ultrasound modality, an acoustic modality, a fiber optical modality, an electromagnetic modality, a magnetic modality, among others. While each of these modalities can be used to obtain various types of well information, data from the various combinations of these example modalities may be combined to obtain even more information regarding the integrity of the well structure or other well insights that modalities do not provide when used individually. In some embodiments, overlapping defects that can confound data from a single imaging modality can be filtered or isolated by using orthogonal measurement techniques involving multiple modalities.

FIG. 1 is a partial cross-sectional view of a well integrity inspection system, illustrating a multi-barrier wellbore 100 with a plurality barriers, such as casing 102, tubing 104, cement layers, and the like. The wellbore 100 may have a series of cylindrical metal casing 102 and cement wall layers between the casing layers 102. The well 100 may be any type of well, including but not limited to conventional and unconventional hydrocarbon producing wells. An inspection tool 106 may be deployed downhole into the well 100 to perform various logging functions, such as detection of various anomalies, such as well defects, eccentricity, flaw structure, topology, integrity, and other information. In the example embodiment, a system provides means for detecting and accounting for casing eccentricity, which may be useful for providing various information about well. In various embodiments, the system may include an imaging device such as a neutron imaging device or probe for annulus defect detection and an electromagnetic probe for detecting wellbore casing eccentricity. The inspection tool 106 may also include detectors for performing measurements of resistivity, neutron porosity, formation bulk density, formation photoelectric factor, natural gamma-ray radiation, among others, using various methods of inspection to determine the status of well structure.

As shown in FIG. 1, inspection tool 106 traverses into the wellbore for determining well integrity of the multi-barrier well. In some embodiments, the inspection tool 106 can determine defects or other anomalies in the barriers (e.g., casings) of the multi-barrier well and/or the plurality of annuli between the barriers. The inspection tool 106 can also determine eccentricities in the casing and/or tubing of the wellbore. As such eccentricities can sometimes confound the wellbore defect data, integrating the wellbore eccentricity data with the wellbore defect data makes it possible to remove the confounded data, thereby providing more accurate information regarding any wellbore defects. The inspection tool 106 may be deployed at the different depths inside the wellbore, and therefore has material and structural integrity to withstand the high pressures and high temperatures at these depths.

Figure 2:
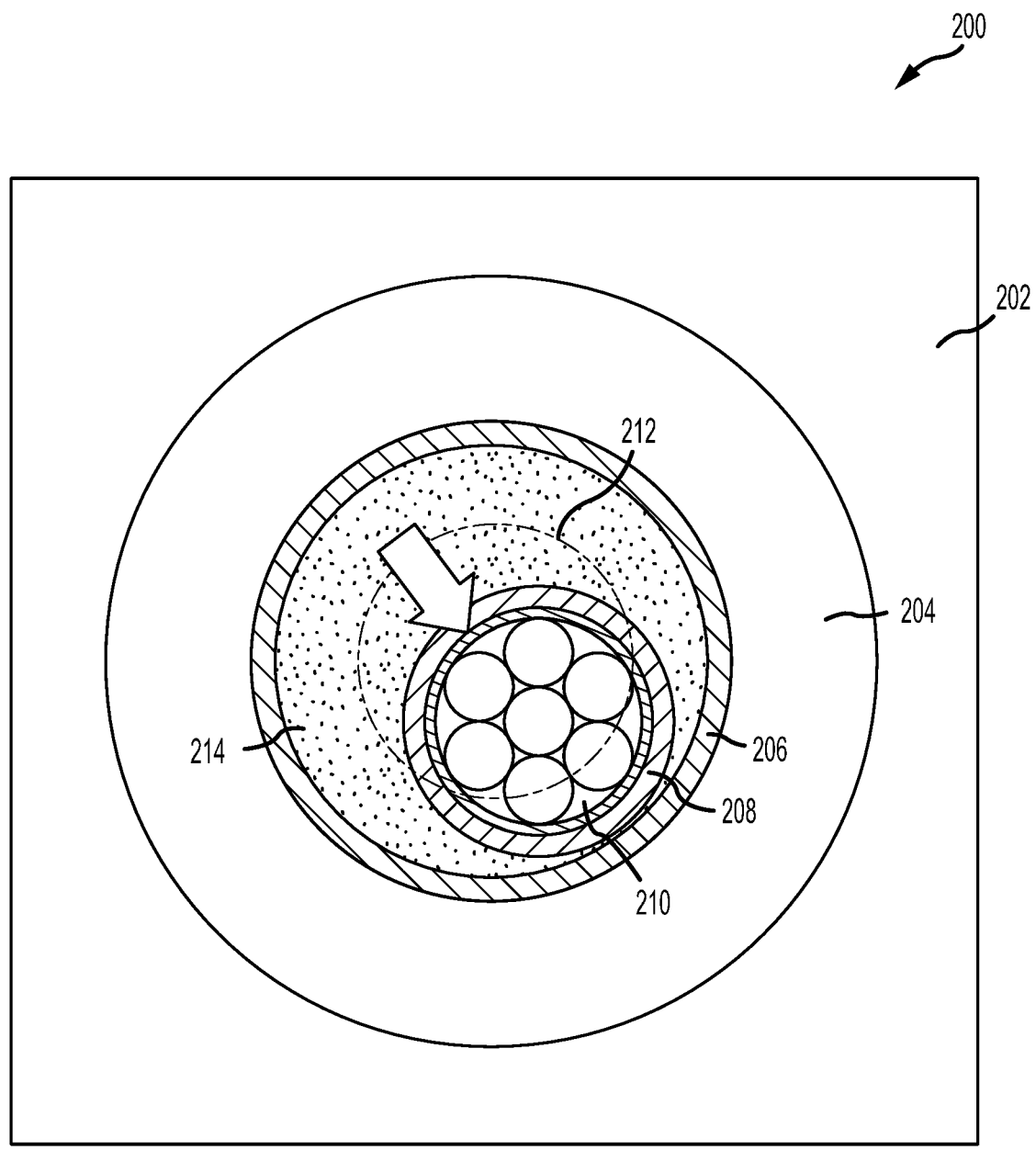
FIG. 2 illustrates a radial cross-sectional view of a wellbore with multiple barriers that exhibits casing eccentricity, in accordance with various embodiments.

For example, FIG. 2 illustrates a radial cross-sectional view of a wellbore 200 with multiple barriers that exhibits eccentricity, in which the present multi-barrier wellbore integrity inspection system with eccentricity correction may be advantageously used, in accordance with an embodiment of the present disclosure. The wellbore 200 includes multiple nested barriers including production tubing 208, casing 206, and cement annulus 204 developed within formation 202. In some embodiments, there may be liquid 214 such as brine or sea water within the casing 206. Ideally, the multiple barriers of a wellbore are perfectly concentric, thereby symmetrically at all angles. However, in real situations, the multiple barriers may exhibit some degree of eccentricity, either due to the initial completion, changes over time, among other reasons. The illustrated wellbore 200 has some eccentricity, in which the production tubing 208 is shifted away from the center position 212. An inspection tool 210 is positioned within the production tubing 208 and can detect the presence and configuration of the eccentricity as well as other types of well defects. As the eccentricity can confound the other wellbore defect data, being able to detect the presence and configuration of the eccentricity makes it possible to remove the confounding data, thereby providing more accurate information regarding the other wellbore defects.

Figure 3:
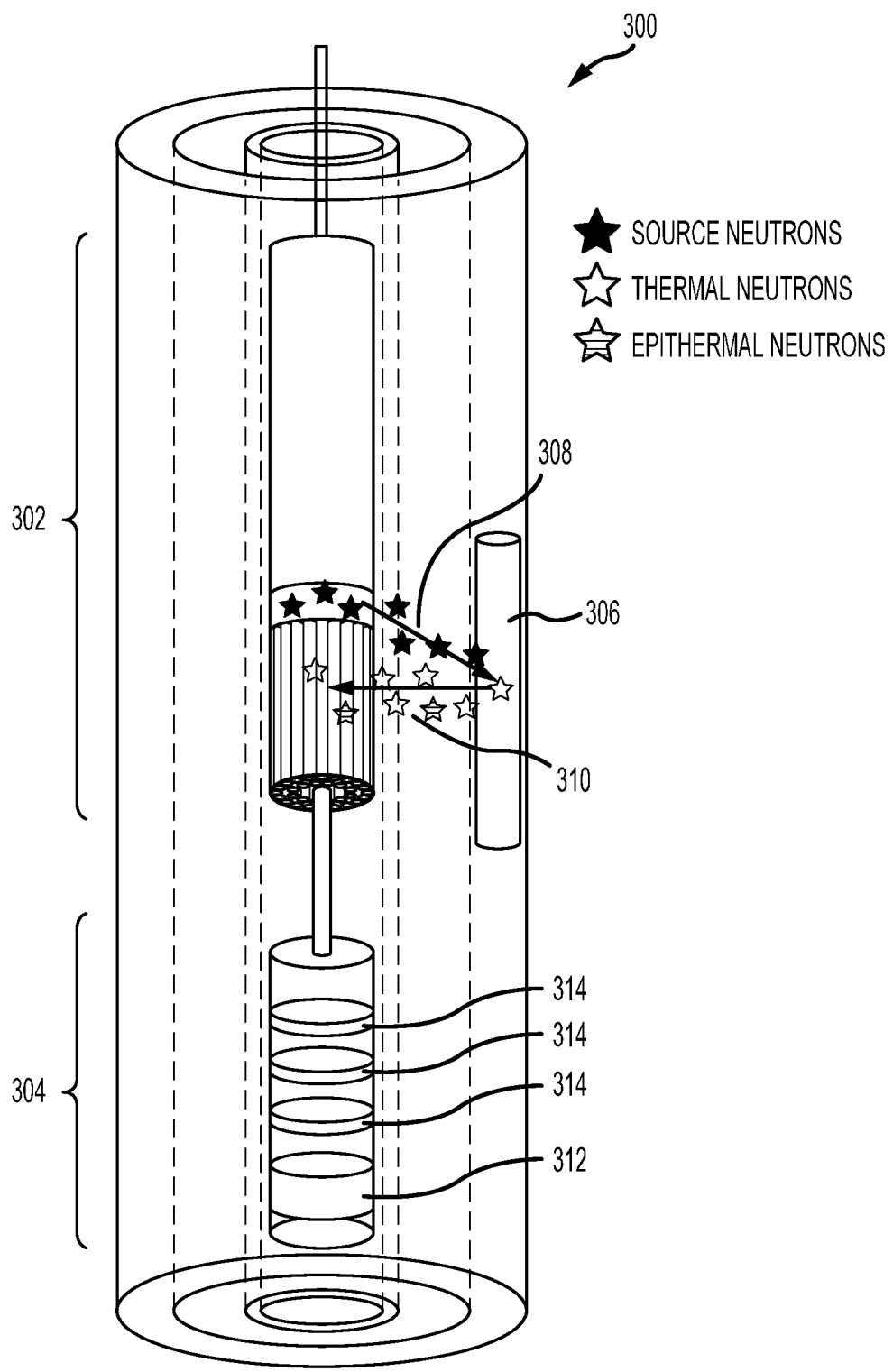
FIG. 3 illustrates a representation of a wellbore integrity inspection tool having a neutron and electromagnetic imaging probe, in accordance with various embodiments.

FIG. 3 illustrates a representation of an example wellbore integrity inspection tool 300, in accordance with various embodiments. This example inspection tool 300 includes a neutron imaging device 302 that provides a neutron imaging modality and an electromagnetic imaging device 304 that provides an electromagnetic imaging modality, such as a pulsed eddy current. Such a multi-barrier inspection tool 300 could be used for through-tubing integrity inspection of wellbore barriers.

In an embodiment, a downhole inspection system includes a neutron imaging device 302 operable to generate data for detecting potential wellbore anomalies and an electromagnetic imaging device 304 operable to generate data for detecting potential wellbore eccentricity. The neutron imaging device 302 includes a neutron generator 308 operable to emit neutrons, and a neutron detector 310 fixed relative to the neutron generation unit and operable to detect backscattered neutrons from a surrounding environment 306 (e.g., wellbore structure). The electromagnetic imaging device 304 includes at least one transmitter 312 for generating electromagnetic pulse, and at least one receiver 314 for detecting returning electromagnetic pulse. Correlation of the neutron imaging data with the electromagnetic imaging data provides additional data regarding the potential wellbore anomalies. In some embodiments, the downhole inspection system includes a tool string lowerable into a wellbore, the neutron imaging device 302 forming at least a portion of the tool string, and the electromagnetic pulse imaging device 304 forming another portion of the tool string. In some embodiments, the neutron imaging device 302 and the electromagnetic imaging device 304 are axially aligned with the wellbore. In some embodiments, the neutron imaging device 302 and the electromagnetic imaging device 304 are co-axially aligned.

In some embodiments, the processor is located remotely from the tool string and the neutron imaging device or the electromagnetic imaging device. For example the processor may be located at a remote facility near the wellsite or far from the wellsite. Data from the neutron imaging device and the electromagnetic imaging device may be transmitted to the processor through many types of communication means, including wired and wireless means, and/or a combination of different means. The data may undergo various processing or analysis, such as by intermediary processors or the like, before reaching the processor. In some embodiments, the processor may be located on the tool string or either imaging device, and/or forming a portion of the tool string, or onboard a device on the tool string.

Neutrons can penetrate through production tubing, offering substantial operation cost reduction by inspecting with the tubing in place. Neutrons can also go through multiple casings, annuli, and deeper into the formation. The neutrons can interact and detect with defects of different types. For example, hydrogen-containing materials strongly scatter and slow down neutrons, while chlorine-containing materials absorb neutrons. Subsequently, neutrons can reverse their path through single or multiple scattering events and reach the probe detector elements, where they are distinguished by the azimuthal direction of the return path and by their arrival energy, or azimuthal and spectral resolution, respectively. However, the algorithm reconstructing the azimuth of the returning neutrons ideally take into account the eccentricity of the neutron tool with respect to the casing, which is a quantity that is generally not able to be extracted solely from neutron data, also known as the centering problem. The most effective method offering the information for eccentricity correction is based on a set of three transmitter-receiver coils pairs that determine the relative distance to the casing walls through triangulation.

In some embodiments, the neutron imaging device and the electromagnetic imaging device may be components in one tool or two or more distinct tools. Whether as a single tool or as multiple tools, the neutron imaging device and the electromagnetic imaging device may be on a tool string, either alone or amongst other tools.

The inspection probe utilizes backscattered neutrons and detectors with azimuthal sensitivity to measure differences in hydrogen content for well defect detection. High hydrogen content materials, such as seen in oil based mud (OBM) defects, form a strong scattering site for neutrons and therefore increase backscatter counts that can be detected by a neutron detector assembly. The neutron modality can be used for detection of annulus defects in a multi-barrier wellbore. For example, backscatter counts may be larger for neutron detector elements closer to a region with strong backscatter, such as an OBM fluid channel. However, casing eccentricity can bias the measurement if the detector axis is shifted away from the defect region. The pulsed eddy current imaging probe with a transmitter coil and multiple receiver coils can be employed to sense eccentricity between multiple casing strings. Fusion of data between the neutron modality and the electromagnetic modality can then be used to correct the neutron response for any casing eccentricity and improve the detection limit of annular defects. A combination with other imaging modalities, such as gamma rays, ultrasound, or acoustics, may be used as well. The detected backscattered radiation can give information about the flaw structure, such as OBM channel defects in multi-barrier wellbores.

In various embodiments, the inspection probe has azimuthal and spectral energy resolution suitable for the detection of structural flaws in multi-barrier wellbores, such as annulus defects like OBM or water based mud (WBM) fluid channels. Other types of wellbore defects, such as gas voids in cement annuli could be detected as well. In various embodiments, a neutron probe is used for annulus defect detection while an electromagnetic probe is used for eccentricity detection and/or correction and for casing material defect detection.

Figure 4:
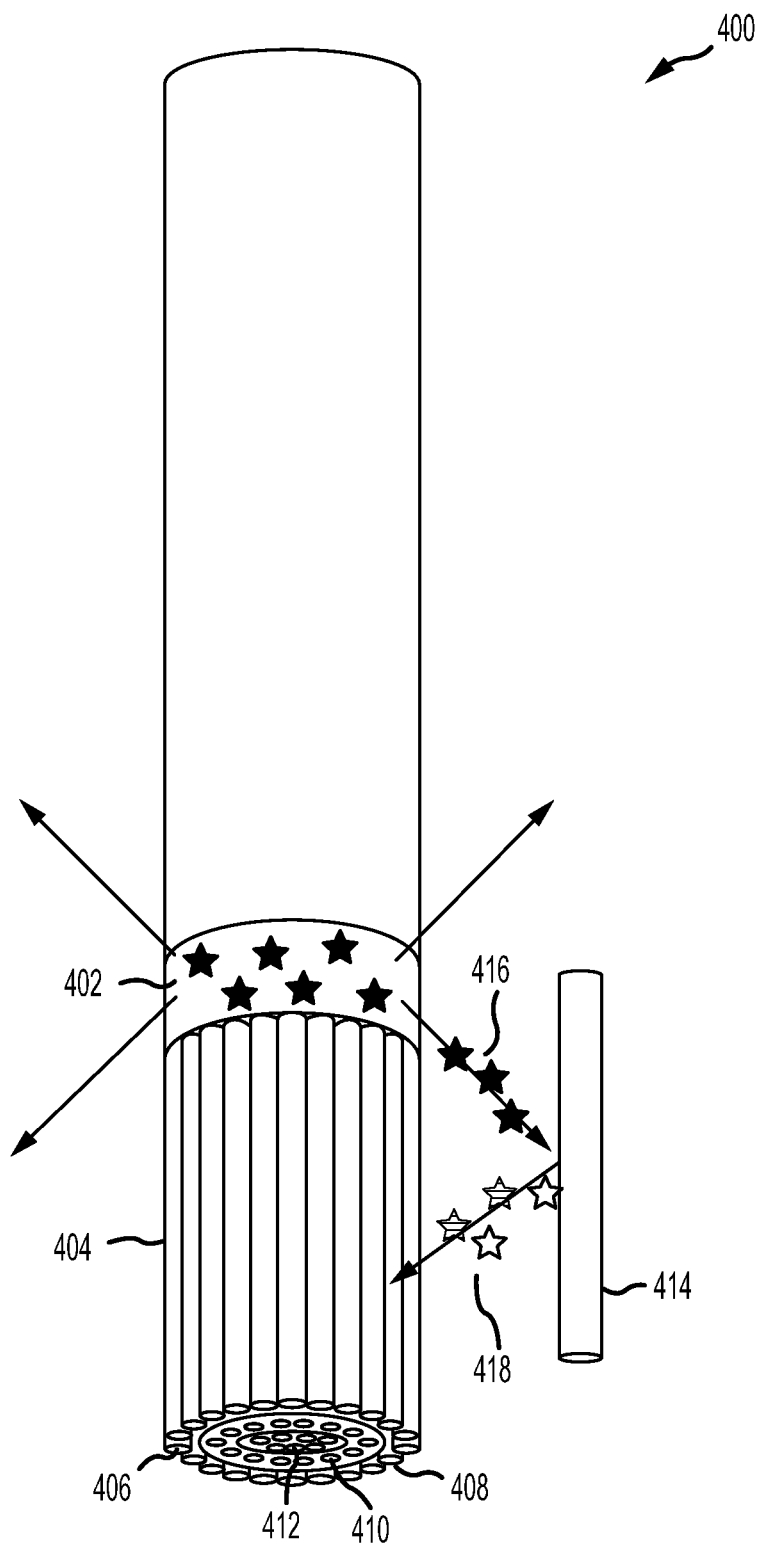
FIG. 4 illustrates an inspection tool having a neutron detector assembly placed near a neutron radiation source to detect backscattered neutrons, in accordance with various embodiments.

FIG. 4 illustrates a neutron imaging device 400 of an inspection tool, such as the inspection tool 300 illustrated in FIG. 3, in accordance with various embodiments. In some embodiments, the neutron imaging device 400 includes a neutron source 402 to emit neutrons 416 towards a target 414, such as a portion of a wellbore. The neutron imaging device 400 also includes a neutron detector assembly 404 to detect backscattered neutrons 418.

In some embodiments, the neutron detector 404 comprises a plurality of individually addressable detector elements 406 arranged in one or more rings (e.g., 408, 410, 412), in which the ring(s) are axially aligned with at least one of the tool string, the neutron generator 402, or the wellbore. The respective amount of backscattered neutrons 418 detected by the individually addressable detector elements 406 may be indicative of an azimuthal direction of the detected backscattered neutrons 418. In some embodiments, the neutron detector 404 comprises a plurality of individually addressable detector elements 406 arranged in a plurality of concentric rings 408, 410, 412. The respective amount of backscattered neutrons 418 detected by the individually addressable detector elements 406 of two or more concentric rings is indicative of an energy level of the backscattered neutrons 418.

For enhanced signal-to-noise the entire neutron probe or just the detector assembly may be rotated around the vertical axis during scanning operations. This allows for multiple measurements of the same defect location and can enhance defect resolution at the cost of slower logging speeds. Faster logging speeds can be achieved if the neutron probe is not rotated. The intensity of the neutron radiation drops inversely with the square of the distance traveled, so a close distance between radiation generation area and detector assembly is desired. High-energy radiation (e.g. DD or DT neutrons) are isotropically emitted from a source target area. The source neutrons are travelling through the surrounding environment and can be scattered, absorbed, and in some instance backscattered by an obstacle (e.g. oil based mud channel defect) towards the detector assembly. Due to the circular arrangement of the detector assembly elements, the orientation of the backscatter source can be resolved. Detector counts will be larger for detector elements that are facing the hydrogen rich defect region while counts will be lower for detector elements facing away. By comparing the count rates for each detector element, the orientation of the defect region can be identified. In the case of a defect at 0° orientation, one measures in the detector at azimuth 0° increased counts for an OBM channel defect, medium count rates for cement, and reduced count rates for an air void or defect, relative to the counts recorded by the detector element oriented at 180.

In addition to azimuthal resolution and defect composition sensing, a center detector can be utilized for spectral energy information. This can be useful for determining the depth of the defect region or provide additional information about the defect material. Incoming radiation with different energy levels may be absorbed and/or slowed down by the outer detector ring. The radiation that is detected by the center detector already made it through the outer detector ring and therefore must have had higher energy. By comparing count rates between inner and outer detectors, quantities of backscatter with different energy levels can be identified. This technique can also be used to identify material composition of the first annulus that is surrounding the production tubing (e.g. brine, cement, or air).

Detecting annulus defects with the neutron imaging probe is difficult when the wellbore casings are eccentric, as illustrated in FIG. 2. Thus, additional sensing modalities, such as pulsed eddy current can be used to independently measure casing eccentricities. The electromagnetic modality is "blind" to non-conductive materials and therefore is not influenced by density variation in cement or other types of annulus defects. Thus, the data collected by the electromagnetic modality can be fused with the data collected from the neutron modality to correct data acquired by the neutron modality by removing confounding aspects of casing eccentricity.

Figure 5A:
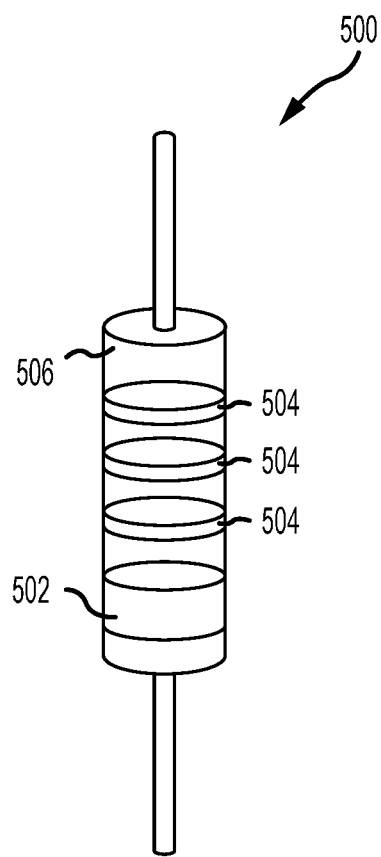
FIG. 5A illustrates a side view of an electromagnetic imaging device for an inspection tool, in accordance with various embodiments.
Figure 5B:
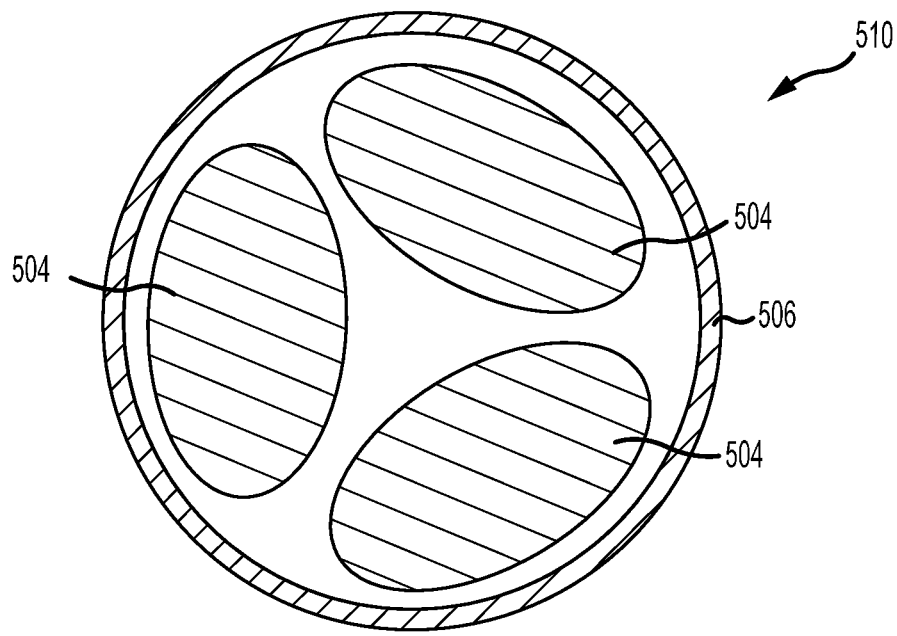
FIG. 5B illustrates a radial cross-sectional view of an electromagnetic imaging device for an inspection tool, in accordance with various embodiments.

FIG. 5A illustrates a side view 500 of an example electromagnetic imaging device 506 for an inspection tool, in accordance with various embodiments. FIG. 5B illustrates a radial cross-sectional view 510 of the electromagnetic imaging device 500 for an inspection tool, in accordance with various embodiments.

Referring to FIGS. 5A and 5B, an example electromagnetic imaging device 506 for an inspection tool includes a transmitter coil 502 for emitting electromagnetic pulses towards a target and three receiver coils 504 for receiving returning electromagnetic pulses from the target. Specifically, in some embodiments, the electromagnetic pulse emitted towards the target induces eddy currents in the target, for example if the target is a metal casing. The eddy currents induced in the target then generate electromagnetic pulses, which are detected by the receiver coils.

In some embodiments, the electromagnetic imaging device includes three transmitter and receiver coil pairs arranged axially symmetrically with respect to the tool string. In some embodiments, the electromagnetic imaging device includes one transmitter coil and a plurality of receiver coils arranged symmetrically with respect to the transmitter coil. wherein respective time delays between generation of the electromagnetic pulse and detection of the returned electromagnetic waves around the wellbore is used in determining eccentricity of the plurality of casing layers.

As illustrated, the three receiver coils 504 are arranged with axial symmetry with respect to the transmitter coil 502 or the wellbore. In some embodiments, triangulation of signals from each of the three receiver coils 504 can be used to identify pipe eccentricity. Other coil configurations can be utilized simultaneously by using other numbers of transmitters and receivers. In some embodiments, an equal number of transmitters and receivers can be used, such as three transmitter-receiver pairs.

Figure 6:
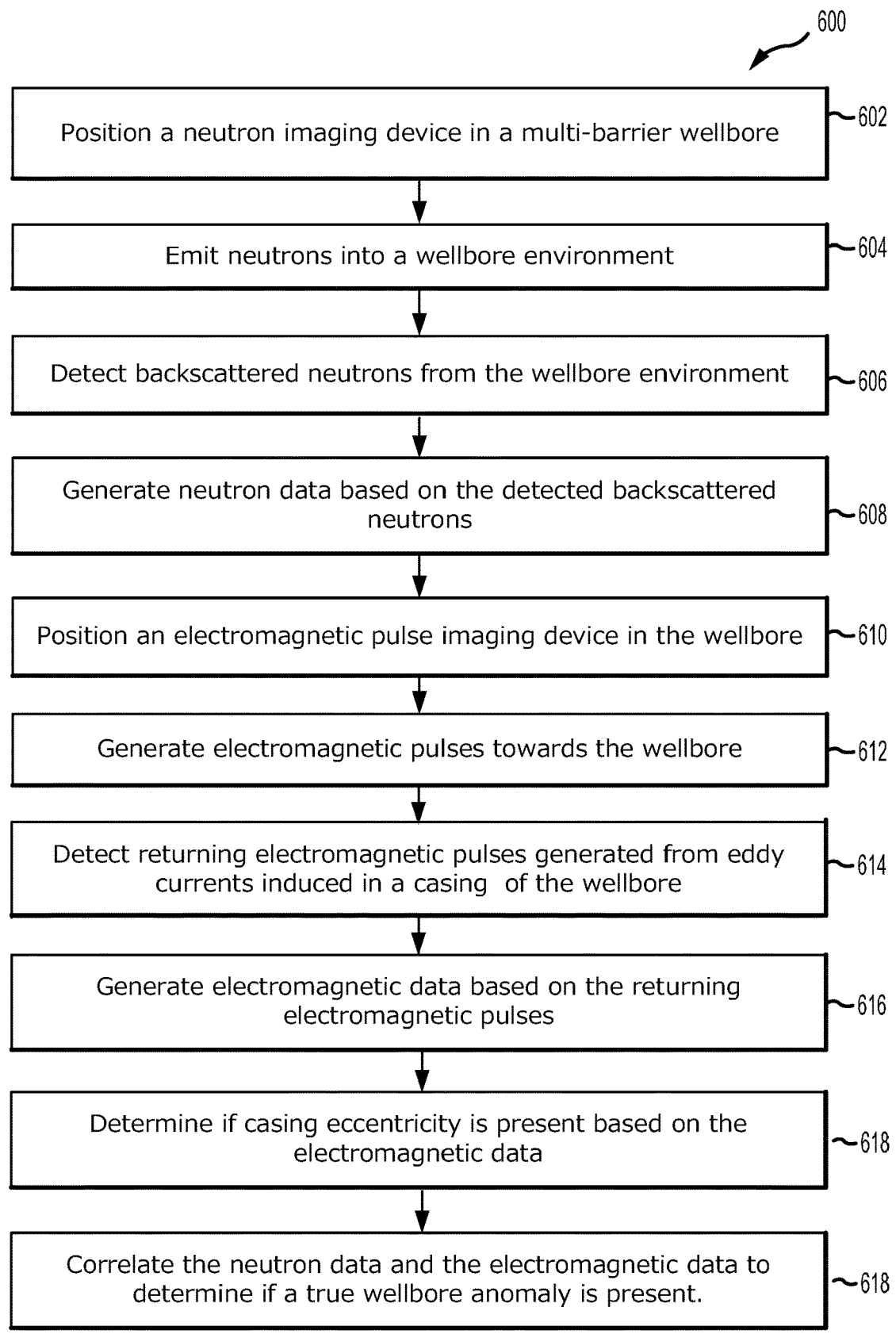
FIG. 6 illustrates an example flow diagram for multi-barrier well inspection with eccentricity correction, in accordance with various embodiments.

FIG. 6 illustrates an example flow diagram 600 for multi-barrier well inspection with eccentricity correction, in accordance with example embodiments. It should be understood that, for any process or method described herein, that there can be additional, alternative, or fewer steps performed in similar or alternative orders, or concurrently, within the scope of the various embodiments unless otherwise specifically stated. In an embodiment, a method of inspecting a wellbore includes positioning 602 a neutron imaging device in a wellbore having a casing comprising one or more layers, emitting 604 neutrons into a portion of a wellbore environment, detecting 606 backscattered neutrons from the portion of the wellbore environment, and generating 608 neutron data for the portion of the wellbore, based at least in part on the detected backscattered neutrons. The method further includes positioning 610 an electromagnetic pulse imaging device in the portion of the wellbore, generating 612 electromagnetic pulses towards the portion of the wellbore, detecting 614 returning electromagnetic pulses generated from eddy currents induced in the casing at the portion of the wellbore, and generating 616 electromagnetic data for the portion of the wellbore based at least in part on the detected returning electromagnetic pulses. The method further includes determining 618 if casing eccentricity is present in the portion of the wellbore based on the electromagnetic data, and correlating 620 the neutron data and the electromagnetic data to determine if a wellbore anomaly is present, wherein the potential wellbore anomaly is structural and not due to casing eccentricity.

In some embodiments, the method includes lowering a tool string into the wellbore, in which the neutron imaging device and electromagnetic imaging device are a part of the same tool string. In some embodiments, the neutron imaging device and the electromagnetic imaging device are axially aligned with at least one of each other, the tool string, or the wellbore. In some embodiments, the above-scribed method may further include positioning the measurement tool at a certain depth in the wellbore, and correlating the data collected by the devices with the depth. In some embodiments, the neutron imaging device and electromagnetic imaging device are not on the same tool string, and the method includes lowering the neutron imaging device into the wellbore during a first tool run, and lowering the electromagnetic imaging device into the wellbore during a second tool run.

In some embodiments, the method includes determining whether an eccentricity is present in the one or more layers of the wellbore casing, and determining whether a potential anomaly is present in or around the wellbore based at least in part on the respective amounts of backscattered radiation detected by the individually addressable detector elements. Such a method may further include determining that the potential anomaly coincides with the eccentricity, and determining that the potential anomaly is due to the eccentricity and not an actual anomaly in the wellbore.

In some embodiments, the neutron detection rates in each of the individual detector elements can be recorded digitally during a given amount of time and correlated with the depth or position of the inspection tool with respect to the wellbore at that time. Likewise, and simultaneously, the time difference between the excitation pulse and the received electromagnetic pulses at each receive coil can also be digitally recorded and correlated with the depth or position of the inspection tool. The pipe axis eccentricity can be calculated by geometric triangulation based on the recorded time differences. A numeric transfer function or algorithm can be applied to process the dataset of individual neutron detection rates, taking in account the measured eccentricity from the electromagnetic modality. Thus it can be determined, with a certain amount of accuracy and/or error margin, the deviation from azimuthal asymmetry due to defect presence in the wellbore structure affecting the path of neutrons returning from the surrounding medium into the detector elements.

In some embodiments, the above-described method may further include determining an optimal function for determining whether a potential anomaly is present, and of which type. This may include obtaining training data, in which the training data including data of respective modalities (e.g., neutron data) detected from previous operations or simulations and the associated known existence of wellbore anomalies, and training a machine learning model using the training data, in which the machine learning model is generating an optimal function for relating detected data of respective modalities and the existence of wellbore anomalies.

In some embodiments, the neutron source unit and the detection unit are translated along the wellbore axis in a "step-and-record" fashion or continuously moving and recording at constant speed or they are rotated around the common axis with a constant or variable angular speed, and wherein further the translation speed and the rotational speed are recorded and time-stamped to be taken in account by the data processing algorithm that detects the azimuthal asymmetry and determines the defect presence, location and possible composition.

Figure 7:
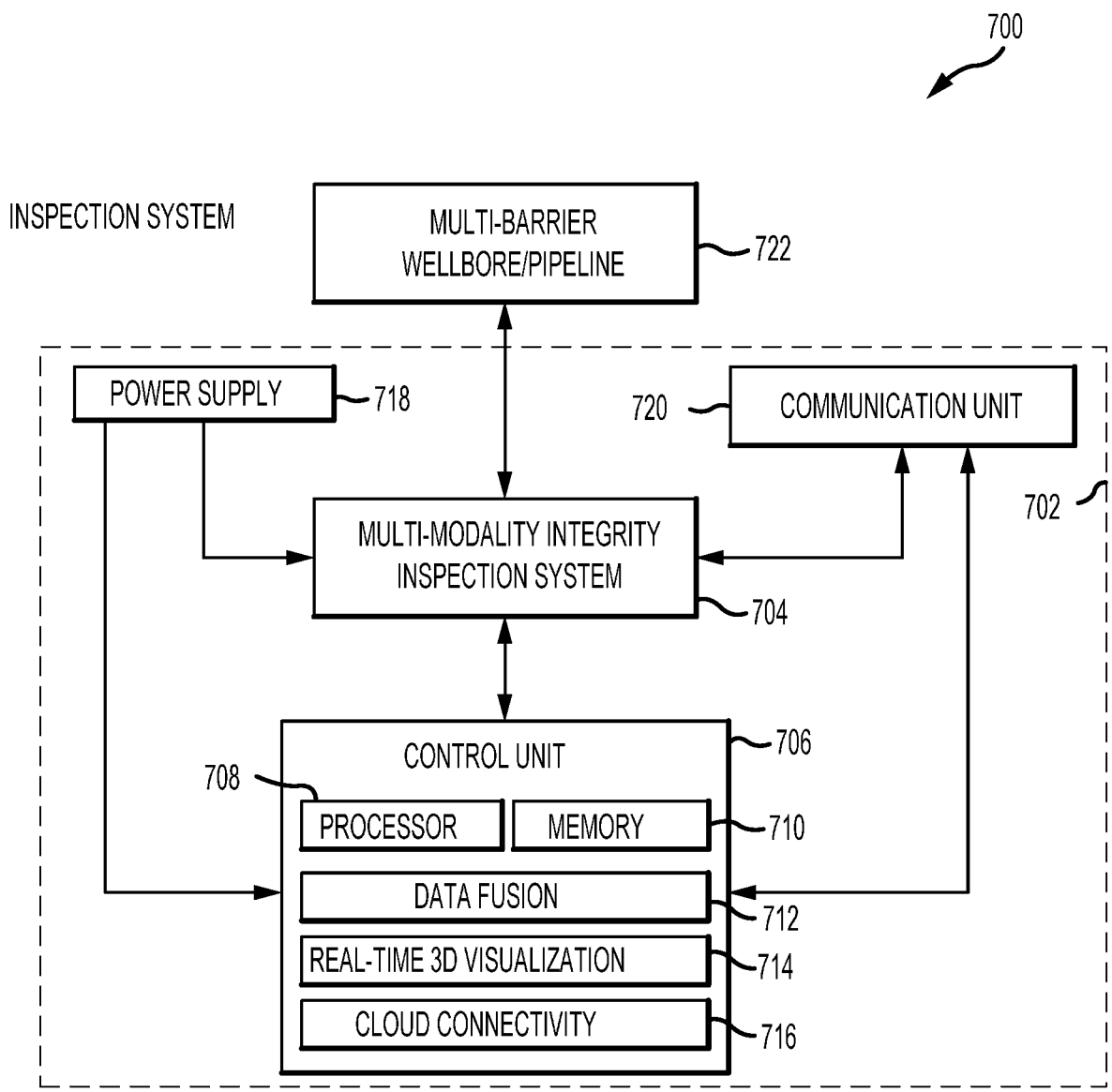
FIG. 7 is a diagram illustrating various components of a multi-modality well inspection system, in accordance with various embodiments.

FIG. 7 is a diagram 700 illustrating various components of a multi-modality well inspection system 702, in which an inspection tool 704 is coupled to (e.g., disposed therein) a wellbore or a pipeline 722. The system 702 further includes a communication unit 720 communicatively coupled to the inspection tool 704 for receiving and transmitting data and control. The system includes a power supply 718 for powering the inspection tool 704. The system 702 includes a control unit 706, which may be located at the surface. The control unit 706 may include a processor 708, a memory 710, a data fusion module 712 for fusing data collected by two or more modalities, a real-time 3D visualization module 714 for generating 3D visual representations of the data, and a cloud connectivity module 716 for sharing the data and generated visual representations of the data. In some embodiment, the data may be shared in real-time as it is collected or processed. In some embodiments, the data is collected, processed, and shared, in real-time subject to any hardware or software processing limitations.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

We claim:

1. A downhole inspection system, comprising:
    a tool string lowerable into a wellbore;
    a neutron imaging device forming at least a portion of the tool string, the neutron imaging device operable to generate data for detecting potential wellbore anomalies, wherein the neutron imaging device comprises:
        a neutron generator operable to emit neutrons; and
        a neutron detector fixed relative to the neutron generation unit and operable to detect backscattered neutrons from a surrounding environment;
    an electromagnetic pulse imaging device forming another portion of the tool string, the electromagnetic pulse imaging device operable to generate data for detecting wellbore eccentricities, wherein the electromagnetic pulse imaging device comprises:
        at least one transmitter coil for generating an electromagnetic pulse; and
        at least one receiver coil for detecting returning electromagnetic waves; and a processor configured to receive data from the neutron imaging device and data from the electromagnetic imaging device, and correlate the neutron imaging data and the electromagnetic imaging data to determine if a detected potential wellbore anomaly is attributable to tool eccentricity in the wellbore.

2. The system of claim 1, wherein the processor is located remotely from the tool string.

3. The system of claim 1, wherein the neutron imaging device and the electromagnetic imaging device are axially aligned with the wellbore.

4. The system of claim 1, wherein the electromagnetic imaging device includes three transmitter and receiver coil pairs arranged axially symmetrically with respect to the tool string.

5. The system of claim 1, wherein the electromagnetic imaging device includes one transmitter coil and a plurality of receiver coils arranged symmetrically with respect to the transmitter coil.

6. The system of claim 1, wherein the wellbore includes a casing with a plurality of layers.

7. The system of claim 1, wherein respective time delays between generation of the electromagnetic pulse and detection of the returned electromagnetic waves around the wellbore are used in determining eccentricity of the plurality of casing layers.

8. The system of claim 1, wherein the neutron detector comprises a plurality of individually addressable detector elements arranged in a ring, the ring axially aligned with at least one of the tool string, the neutron generator, or the wellbore, wherein respective amount of backscattered neutrons detected by the individually addressable detector elements is indicative of an azimuthal direction of the detected backscattered neutrons.

9. The system of claim 1, wherein the neutron detector comprises a plurality of individually addressable detector elements arranged in a plurality of concentric rings, wherein the respective amount of backscattered neutrons detected by the individually addressable detector elements of two or more concentric rings is indicative of an energy level of the backscattered neutrons.

10. The system of claim 9, wherein the neutron imaging device and the electromagnetic imaging device are co-axially aligned.

11. The system of claim 9, wherein the neutron detector comprises a plurality of individually addressable detector elements arranged in a ring axially symmetric to the neutron generator.

12. A downhole inspection system, comprising:
a neutron imaging device operable to generate data for detecting potential wellbore anomalies, wherein the neutron imaging device comprises:
a neutron generator operable to emit neutrons; and
a neutron detector fixed relative to the neutron generation unit and operable to detect backscattered neutrons from a surrounding environment;
an electromagnetic imaging device operable to generate data for detecting wellbore eccentricity, wherein the electromagnetic imaging device comprises:
at least one transmitter for generating electromagnetic pulse; and
at least one receiver for detecting returning electromagnetic pulse,
wherein correlation of the neutron imaging data with the electromagnetic imaging data provides additional data regarding the potential wellbore anomalies.

13. The system of claim 12, wherein the neutron imaging data is indicative of whether potential wellbore anomalies are present.

14. The system of claim 13, wherein the electromagnetic imaging data is indicative of whether a potential wellbore casing eccentricity is present.

15. The system of claim 14, wherein correlation of the neutron imaging data and the electromagnetic imaging data is indicative of determine whether an actual wellbore anomaly is present, wherein the actual wellbore anomaly is structural and not due to casing eccentricity.

16. A method of inspecting a wellbore, comprising:
positioning a neutron imaging device in a wellbore having a casing comprising one or more layers;
emitting neutrons into a portion of a wellbore environment;
detecting backscattered neutrons from the portion of the wellbore environment;
generating neutron data for the portion of the wellbore, based at least in part on the detected backscattered neutrons;
positioning an electromagnetic pulse imaging device in the portion of the wellbore;
generating electromagnetic pulses towards the portion of the wellbore;
detecting returning electromagnetic pulses generated from eddy currents induced in the casing at the portion of the wellbore;
generating electromagnetic data for the portion of the wellbore based at least in part on the detected returning electromagnetic pulses;
determining if casing eccentricity is present in the portion of the wellbore based on the electromagnetic data; and
correlating the neutron data and the electromagnetic data to determine if a wellbore anomaly is present, wherein the potential wellbore anomaly is structural and not due to casing eccentricity.

17. The method of claim 16, further comprising:
lowering a tool string into the wellbore, wherein the neutron imaging device and electromagnetic imaging device are a part of the same tool string.

18. The method of claim 16, further comprising:
lowering the neutron imaging device into the wellbore during a first tool run; and
lowering the electromagnetic imaging device into the wellbore during a second tool run.

19. The method of claim 16, further comprising:
determining whether an eccentricity is present in the one or more layers of the wellbore casing; and
determining whether a potential anomaly is present in or around the wellbore based at least in part on the respective amounts of backscattered radiation detected by the individually addressable detector elements.

20. The method of claim 19, further comprising:
determining that the potential anomaly coincides with the eccentricity; and
determining that the potential anomaly is due to the eccentricity and not an actual anomaly in the wellbore.

* * * * *